(12) United States Patent
Kaplan et al.

(10) Patent No.: US 9,836,471 B2
(45) Date of Patent: Dec. 5, 2017

(54) SYSTEM AND METHOD OF HANDLING FILE METADATA

(75) Inventors: Marc Kaplan, San Jose, CA (US); Ravi Wijayaratne, San Jose, CA (US); Kevin Osborn, Santa Cruz, CA (US); Dan Burrows, San Jose, CA (US)

(73) Assignee: Overland Storage, Inc., San Diego, CA (US)

( * ) Notice: Subject to any disclaimer, the term of this patent is extended or adjusted under 35 U.S.C. 154(b) by 0 days.

(21) Appl. No.: 13/619,007

(22) Filed: Sep. 14, 2012

(65) Prior Publication Data

US 2013/0013643 A1 Jan. 10, 2013

Related U.S. Application Data

(60) Division of application No. 12/272,444, filed on Nov. 17, 2008, now Pat. No. 8,589,449, which is a (Continued)

(51) Int. Cl.
*G06F 7/00* (2006.01)
*G06F 17/30* (2006.01)
*G06F 13/14* (2006.01)

(52) U.S. Cl.
CPC ... *G06F 17/3012* (2013.01); *Y10S 707/99932* (2013.01); *Y10S 707/99933* (2013.01);
(Continued)

(58) Field of Classification Search
CPC ......... G06F 17/30067; G06F 17/30011; G06F 17/30595; G06F 17/30156; G06F 17/3012; G06F 17/30106; G06F 17/30949; G06F 17/30076; G06F 17/30091; G06F 17/30569; G06F 11/1469; G06F 17/3028; G06F 11/1435; G06F 11/1451; G06F 11/1458; G06F 12/0866; G06F 17/30719; G06F 17/30896; G06F 17/30899
(Continued)

(56) References Cited

U.S. PATENT DOCUMENTS 5,359,725 A * 10/1994 Garcia .................. G06F 3/0601
5,857,203 A 1/1999 Kauffman et al.
(Continued)

*Primary Examiner* — Heather Herndon
*Assistant Examiner* — Cecile Vo
(74) *Attorney, Agent, or Firm* — Knobbe, Martens, Olson & Bear, LLP

(57) ABSTRACT

A network storage system comprises data storage, one or more file system APIs, and a metadata handler. The data storage can comprise file data and associated metadata. The file system APIs can be configured to read and write file data and metadata to and from the data storage. The metadata handler can have a library of functions for handling the metadata. The library can include a metadata blob creation function and a metadata blob extraction function. The metadata blob creation function cooperates with the file system APIs to read source metadata associated with specified file data and creates and populates a metadata blob from which a substantial copy of the source metadata can be generated. The metadata blob extraction function receives at least a metadata blob, extracts information from the metadata blob, and cooperates with the file system APIs to generate destination metadata, a substantial copy of the source metadata.

12 Claims, 8 Drawing Sheets

Related U.S. Application Data continuation of application No. 11/118,617, filed on Apr. 29, 2005, now Pat. No. 7,454,406.

(52) U.S. Cl.
CPC .......................... *Y10S 707/99934* (2013.01); *Y10S 707/99935* (2013.01); *Y10S 707/99936* (2013.01); *Y10S 707/99939* (2013.01); *Y10S 707/99953* (2013.01)

(58) Field of Classification Search
USPC .... 707/640, 770, 999.001, 999.102, E17.01, 707/E17.044, 755, 769, 771, 784, 954, 707/610, 825, E17.045, E17.089, 698, 707/694, 758, 828, 999.1, 999.009, 707/E17.031, 999.107, 999.204, E17.094, 707/999.103; 714/6.3, 13
See application file for complete search history.

(56) References Cited

U.S. PATENT DOCUMENTS

| | | | |
|---|---|---|---|
| 5,873,097 A | 2/1999 | Harris et al. | |
| 6,538,969 B1 * | 3/2003 | Vitkus | G06F 3/0626 369/275.3 |
| 6,564,215 B1 * | 5/2003 | Hsiao et al. | |
| 7,185,030 B2 | 2/2007 | Kodama | |
| 7,249,251 B2 | 7/2007 | Todd et al. | |
| 7,328,366 B2 * | 2/2008 | Michelman | G06F 11/1458 711/162 |
| 7,392,263 B2 | 6/2008 | Acharya et al. | |
| 7,454,406 B2 * | 11/2008 | Kaplan | G06F 17/3012 |
| 7,516,133 B2 * | 4/2009 | Kodama | G06F 17/30067 |
| 7,693,849 B2 * | 4/2010 | Hess | G06F 21/6209 707/999.1 |
| 7,743,019 B2 * | 6/2010 | Shah | G06F 17/30067 707/610 |
| 8,156,090 B1 * | 4/2012 | Curles | G06F 17/3012 707/694 |
| 8,229,897 B2 * | 7/2012 | Cannon | G06F 11/1469 707/644 |
| 8,306,991 B2 * | 11/2012 | Borthakur et al. | 707/760 |
| 8,589,449 B2 * | 11/2013 | Kaplan | G06F 17/3012 707/803 |
| 2004/0139043 A1 * | 7/2004 | Lei | G06F 21/6227 |
| 2006/0036631 A1 | 2/2006 | Cheslow | |
| 2006/0182357 A1 | 8/2006 | Liu et al. | |
| 2007/0038647 A1 | 2/2007 | Thomas et al. | |
| 2007/0185934 A1 * | 8/2007 | Cannon | G06F 11/1469 |

* cited by examiner

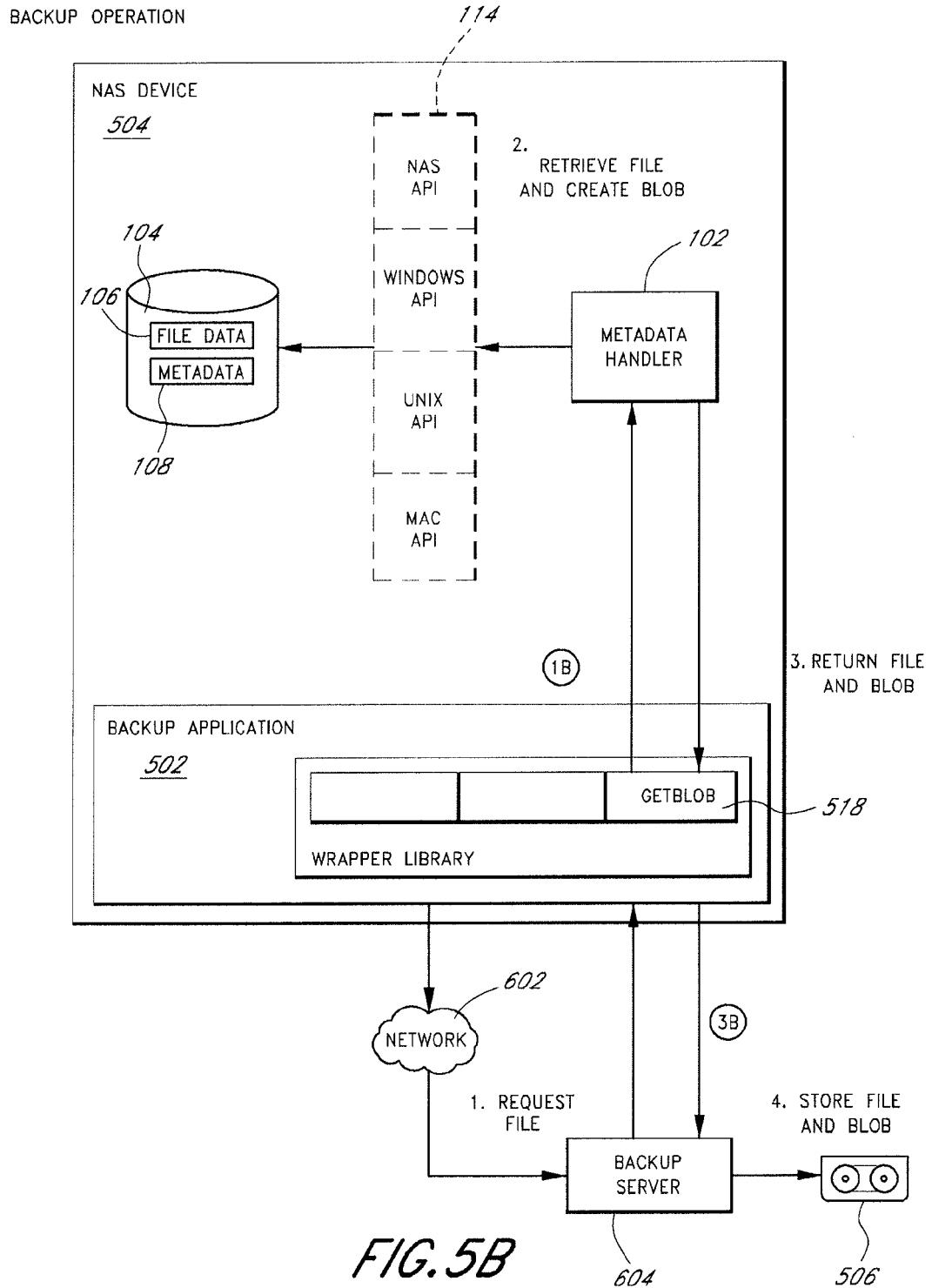

SYSTEM AND METHOD OF HANDLING FILE METADATA

CROSS REFERENCE TO RELATED APPLICATIONS

This application is a divisional of U.S. patent application Ser. No. 12/272,444, filed on Nov. 17, 2008, which is a continuation U.S. patent application Ser. No. 11/118,617, filed on Apr. 29, 2005, now U.S. Pat. No. 7,454,406.

BACKGROUND OF THE INVENTION

Field of the Invention

The system and method described herein relates to the handling of file system metadata.

Description of the Related Art

Network-attached storage provides a system architecture for providing centralized data storage for a computer network. In this architecture, one or more network-attached storage devices ("NAS devices") are connected to storage devices, including, for example, hard drives. A system administrator configures the computer network such that individual computers store network-accessible data files centrally on one or more of the NAS devices.

A NAS device is connected to a network and can be accessed by other devices and computers connected to the same network. NAS devices generally have specialized operating systems that allow them to efficiently handle file operations, including, for example, file read and write operations, file storage, file retrieval, file backup, file restore, and the like. These specialized operating systems, however, generally are not optimized to perform operations associated with application programs. Rather, in a network with NAS devices, a traditional server typically performs operations related to applications and NAS devices perform file operations.

One function of a NAS device is to provide a mechanism to backup, restore, and migrate data files from different file systems, including UNIX file systems, Macintosh file systems, Windows file systems, and the like. (Note that this application uses several terms, including UNIX, Macintosh, Windows, and Linux, that may be trademarks or registered trademarks.) These operations, which we herein generally call "data replication operations," require faithful replication of each file's raw data and extended attributes or metadata associated with each file. Each file system stores such metadata in a different way. Accordingly, while operating systems typically provide data replication operations that can successfully replicate metadata associated with native files, developers face difficulty in creating generic data replication operations that can successfully replicate metadata associated with files from multiple file systems.

SUMMARY

This application describes various systems and methods that allow for the replication of metadata associated with files from multiple file systems. Advantageous embodiments of such systems and methods reduce or eliminate loss of metadata caused by transmitting or storing the metadata using one or more non-native file systems. This summary provides a concise overview of some advantageous embodiments described herein but does not describe every embodiment and does not define the invention.

Embodiments of a metadata handler can advantageously be used in a network storage system to support various data replication operations. One embodiment of such a network storage system comprises data storage, one or more file system APIs, and a metadata handler. The data storage can be configured to store file data and metadata associated with the file data. The data storage can store file data and associated metadata of multiple file systems. For example, a portion of the metadata can be native to one file system while another portion of the metadata can be native to another file system.

In one embodiment, the file system APIs are configured to define operations for writing file data and metadata to the data storage and reading file data and metadata from the data storage. In a preferred embodiment, the metadata handler has a library of functions for handling the metadata from the multiple file systems. This library can include, for example, a metadata blob creation function and a metadata blob extraction function. These functions preferably execute when called by a calling application.

In one embodiment, when a calling application calls the metadata blob creation function, the function cooperates with at least one of the file system APIs to read, from the data storage, source metadata associated with specified file data. The function creates a metadata blob and populates at least a portion of this metadata blob with information from which a substantial copy of the source metadata can be generated. Preferably, the populated portion corresponds to metadata fields used by the source metadata's native file system.

In one embodiment, when a calling application calls the metadata blob extraction function, the function receives at least a metadata blob and extracts information from this metadata blob. The function cooperates with at least one of the file system APIs in order to generate destination metadata from the extracted information. The function, in cooperation with the APIs, stores the destination metadata in the data storage. Advantageously, if the received metadata blob was generated by the metadata blob creation function from source metadata, the destination metadata is a substantial copy of the source metadata.

Embodiments of a network storage system can also include one or more client applications configured to use the metadata handler. For example, a backup application can call the metadata handler's metadata blob creation function in order to receive a metadata blob that encapsulates the file's metadata. The backup application can store the file and the metadata blob on a backup storage device, such as, for example, an external tape drive. Conversely, a backup application can also call the metadata handler's metadata blob extraction function in order to restore a the metadata blob to the file, effectively restoring the file's metadata. Data migration applications can call the metadata blob creation function and the metadata blob extraction function in turn in order to transfer a file's associated metadata from one storage device to another.

Accordingly, embodiments of the metadata handler can be used in a network storage system to support data replication operations that allow for an exact or substantially exact replication of metadata even when the metadata is temporarily stored on a file system that cannot read the metadata. This is because the metadata handler creates and reads metadata blobs that encapsulate sufficient information to faithfully reproduce or at least substantially reproduce the metadata. Multiple file systems can be configured to store such metadata blobs, without even knowing how to read the blobs, and the blobs can later be restored on a system that has access to a metadata handler. Many advantageous alternative embodiments of the metadata handler, storage systems for using the metadata handler, and methods enabled by the metadata handler exist. The Detailed Description of Preferred Embodiments, the Drawings, and the Claims explicitly describe many such embodiments and render other embodiments apparent to a skilled artisan.

BRIEF DESCRIPTION OF THE DRAWINGS

FIG. 5B is a block diagram illustrating another hardware configuration in which a metadata handler in accordance with one embodiment can be used to support a data backup operation.

DETAILED DESCRIPTION OF PREFERRED EMBODIMENTS

Embodiments of the metadata handler as described herein can be used in a network storage system to support data replication operations that allow for an exact or substantially exact replication of metadata even when the metadata is temporarily stored on a file system that cannot read the metadata. The metadata handler creates and reads metadata blobs that encapsulate sufficient information to faithfully reproduce or at least substantially reproduce the metadata. Multiple file systems can be configured to store such metadata blobs, without even knowing how to read the blobs, and the blobs can later be restored on a system that has access to a metadata handler.

This section describes, with reference to the drawings, a general architecture that implements various features of the embodiments described herein. The drawings and the associated descriptions illustrate preferred embodiments but do not limit the scope of the invention to those preferred embodiments. Throughout the drawings, reference numbers are re-used to indicate correspondence between referenced elements. In addition, the first digit of each reference number indicates the figure in which the element first appears.

Figure 1:
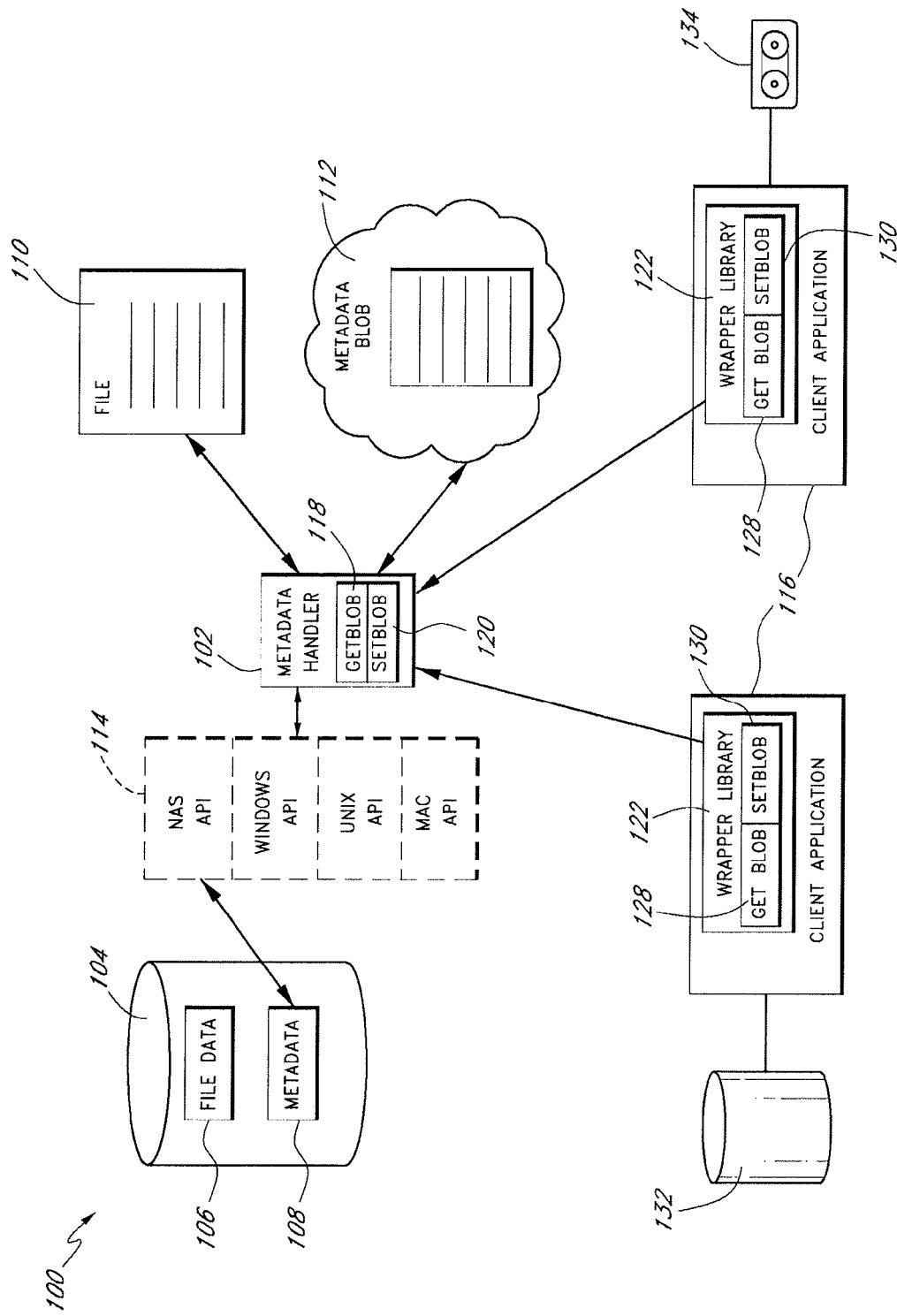
FIG. 1 is a block diagram of an embodiment of a computer system that includes a metadata handler.

FIG. 1 is a block diagram of an embodiment of a computer system that includes a metadata handler. In general, in one embodiment such a computer system 100 comprises a metadata handler 102, data storage 104, one or more file system application programming interfaces ("APIs") 114, and one or more client applications 116. (Throughout this application, "APIs" means "one or more APIs," while "plurality of APIs" means "two or more APIs." Similarly, whenever this application uses the construction "one or more<plural noun>," any other use of "<plural noun>" in this application means "one or more<plural noun>," while "plurality of <plural noun>" means "two or more<plural noun>.") In a preferred embodiment, the metadata handler 102, data storage 104, APIs 114, and client applications 116 reside in a NAS device. This, however, is not required. In alternative embodiments, the metadata handler 102, data storage 104, APIs 114, and client applications 116 can reside in a UNIX file server, a Windows file server, a Macintosh file server, a Linux file server, or any other type of file server known to a skilled artisan. Alternatively, the metadata handler 102, data storage 104, APIs 114, and client applications 116 can be distributed across multiple devices.

Data Storage

The data storage 104 comprises file data 106 and metadata 108. The file data 106 comprises raw data files or directories, including, for example, word processing documents, text documents, directories, executable files, compressed data files, image files, movie files, audio files, spreadsheet documents, slide presentation documents, and the like. A skilled artisan will appreciate, in light of this disclosure, that many other types of data files exist and can be stored in the file data 106.

The metadata 108 comprises metadata as generally understood by a skilled artisan and at least encompasses attributes associated with each data file or directory that assists a file system, an automated process, or a user to classify the associated data file. Metadata 108 can include but need not include one, any subset of, or all of the following: name, description, keywords, access permissions, size, date and time created, date and time modified, whether the file is read-only, whether the file is archived, and the like. Accordingly, the metadata 108 can be used by a file system, an automated process, or a user in order to index data files, find a particular data file, sort data files, allow or deny access to data files, display data files that meet certain criteria, automatically modify, backup, or delete data files that meet specified criteria, and the like. A skilled artisan will appreciate many other types of metadata and uses for metadata, all of which may be encompassed by the metadata 108 in certain embodiments.

Each file and its corresponding metadata stored in the file data 106 and the metadata 108 corresponds to a particular native file system. For example, some of the file data 106 may represent native Windows files, while other portions of the file data 106 may represent native Unix files, native Linux files, native Macintosh files, and the like. Similarly, some of the metadata 108 may correspond to native Windows files, native Unix files, native Linux files, native Macintosh files, or the like.

Despite storing file data 106 and metadata 108 that may natively correspond to several different file systems, the data storage 104 resides in one or more host storage devices with preferably one file system for storing and accessing the file data 106 and metadata 108. Accordingly, despite each file's underlying native format, each file and its associated metadata are stored in the file data 106 and metadata 108 in files or records formatted in accordance with the host storage device's file system. For example, if the host storage device is a NAS device, the file data 106 and metadata 108 are stored in files formatted in accordance with the NAS file system. In one embodiment, the host storage devices comprise NAS devices. Alternatively, the host storage devices can comprise Windows file servers, Unix file servers, Linux file servers, Macintosh file servers, or file servers running any other known operating system.

Generally, storing data files and metadata natively formatted for one file system in data storage residing in a different host file system can cause loss of data or metadata.

Embodiments of the systems and methods described herein provide a mechanism for storing file data 106 and metadata 108 in a non-native file system, while preserving native data and native metadata such that such data and metadata can be accessed by a native file system without loss of the file data 106 or the metadata 108. Embodiments of the systems and methods focus primarily on preserving metadata 108 because loss of metadata is more common than loss of data. This is because many data files are stored in standard formats that can be read by many operating systems and applications with little or no modification.

Metadata Blob

In a preferred embodiment, the metadata handler 102 assists with preserving native metadata by generating and reading a metadata blob 112 that encapsulates the metadata 108. Preferably, the metadata blob 112 one or more advantageous features for facilitating the preservation of metadata of many different formats, such as, for example, UNIX metadata, Windows metadata, Macintosh metadata, Linux metadata, and other formats of metadata known to a skilled artisan. This section describes many such advantageous, but not necessarily required, features of embodiments of the metadata blob 112. This section describes preferred embodiments but does not limit the invention to these preferred embodiments. Rather, a skilled artisan will appreciate that many variations exist that do not have all features of the preferred embodiments but which are nevertheless advantageous and useful.

In a preferred embodiment, the metadata blob 112 is a binary large object. However, the metadata blob 112 is not required to be a binary large object but may be any digital object of any format suitable for storing metadata and capable of being stored and retrieved by a file system or a database. By way of example, an object can be any data aggregation suitable for encapsulating information, including but not limited to, components, attributes, databases, tables, arrays, variables, binary large objects, and the like. In a preferred embodiment, the metadata blob 112, which the metadata handler 102 is configured to create and to read, has sufficient data fields to store metadata used by many different file systems. Preferably, the metadata handler 102 supports at least Windows, Unix, Linux, and Macintosh file systems and therefore the metadata blob 112 that the metadata handler 102 generates and reads has sufficient data fields to store some or all of the metadata used by these file systems. Alternatively, the metadata handler 102 can be configured to support any subset of two or more of the foregoing file systems, or any group of two or more file systems that includes other known file systems.

As used herein, the term "file system" encompasses traditional file systems such as Windows and Unix and further encompasses systems in which files are stored in one or more database records. A skilled artisan will appreciate that variations exist of the listed file systems and other file systems and that each variation may be treated as a separate file system. Alternatively, in cases where variations use substantially similar metadata fields, two or more variations may be treated as a single file system.

While it is preferable for the metadata blob 112 to be able to store all of the metadata used by every supported file system, the metadata blob 112 can be configured to store only some of the metadata used by one or more of the supported file systems. For example, several alternatives are that the metadata blob 112 supports at least 2, 3, 4, 5, 6, 7, or more file systems and stores every metadata field or at least 90% of the fields, 80%, 70%, 60%, 50%, or 25% of the fields used by the at least 2, 3, 4, 5, 6, 7, or more supported file systems.

Advantageously, the metadata blob 112 stores sufficient information to allow the metadata handler 102 to extract and store in data storage 104 the metadata from the metadata blob 112, even though each metadata blob 112 may store differing metadata formats. For example, the metadata handler 102 may perform a first operation in which it extracts and stores the metadata stored in a metadata blob A having Unix metadata and perform a second operation in which it extracts and stores the metadata stored in a metadata blob B having Windows metadata. The metadata blob 112 advantageously stores sufficient information to allow the metadata handler 102 to perform each of these operations.

In a preferred embodiment, the metadata blob 112 includes a data field for every supported metadata field of every supported file system. In this embodiment, for each file, only data fields that correspond to the file system of that file are populated. Alternatively, other data fields not used by the file system of the file are also populated, but are either ignored or are used to store other information that the metadata handler 102 does not store in the metadata 108. Advantageously, this format simplifies the logic of the metadata handler 102.

Alternatively, the metadata blob 112 can include a file system identification field and a data field for the supported metadata fields of an identified file system. For example, in this embodiment, the metadata blob 112 corresponding to a Unix file may have "Unix" in the file system identification field, followed by metadata fields corresponding to Unix, such as user, group, and other file access permissions. An advantageous of this alternative embodiment is that it reduces the size of each metadata blob 112 because unpopulated fields are not used. A skilled artisan will appreciate, however, that this alternative requires additional logic in the metadata handler 102 in order to generate and read multiple blob formats.

In another embodiment, the metadata blob 112 has a specific format for each file system but no file system identification field. When metadata blobs 112 according to this embodiment are used, the metadata handler 102 is configured to recognize by differences in formatting which file system corresponds to each metadata blob 112. A skilled artisan will appreciate that still more complexity is needed in the logic of the metadata handler 102 to support this type of metadata blob 112.

By way of example and not limitation, a non-exhaustive list of metadata fields that the metadata blob 112 can store includes name, description, keywords, access permissions, size, date and time created, date and time modified, whether the file is read-only, whether the file is archived, and the like. A non-exhaustive list of Windows metadata that the metadata blob 112 can store includes DOS attributes, Windows Security Descriptors, Windows Access Control Lists (ACLS), etc. A non-exhaustive list of Unix metadata that the metadata blob 112 can store includes POSIX Access Control Lists, Extended Attributes, etc. A non-exhaustive list of Macintosh metadata that the metadata blob 112 can store includes Resource Fork, shortcuts, etc. A non-exhaustive list of Linux metadata that the metadata blob 112 can store includes POSIX Access Control Lists, Extended Attributes, etc. A skilled artisan will appreciate, in light of this disclosure, that many other metadata fields exist.

Figure 4:
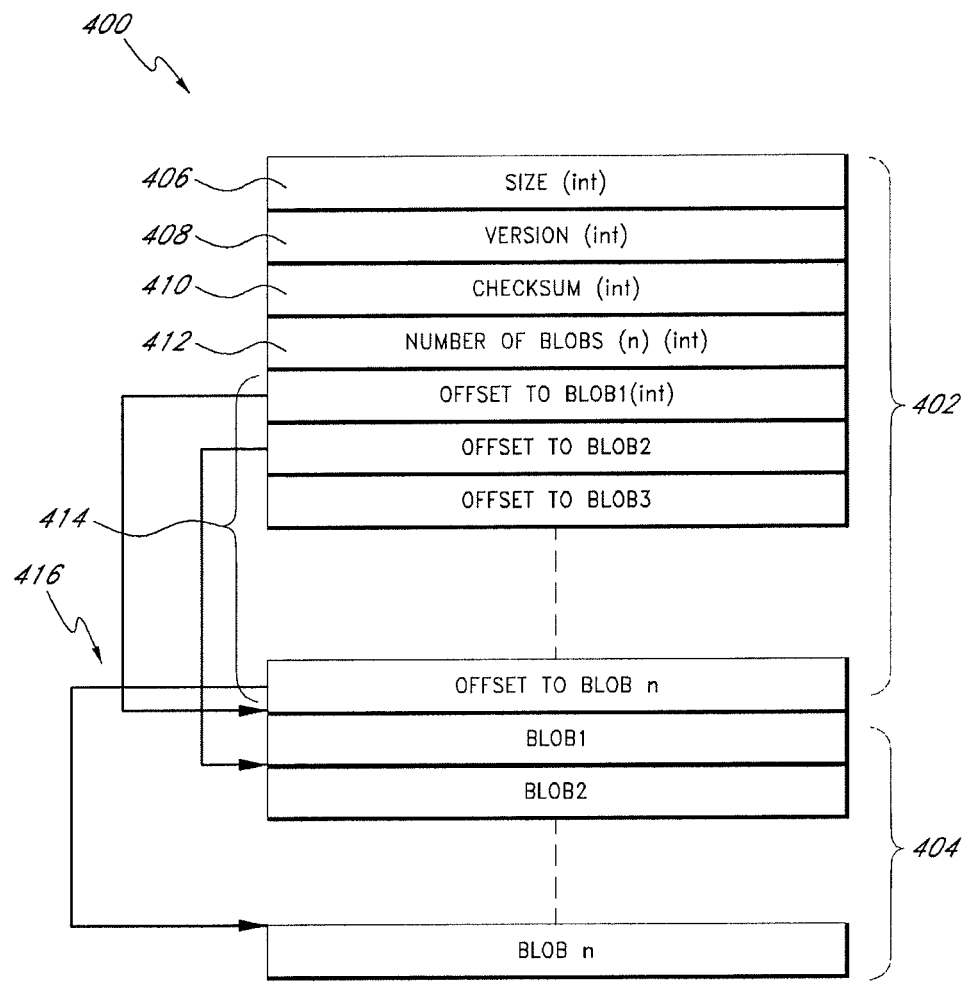
FIG. 4 is a diagram illustrating a data structure for transmitting and storing one or more metadata blobs according to one embodiment.

FIG. 4 is a diagram illustrating a data structure for transmitting and storing one or more metadata blobs according to one embodiment. As illustrated, the data structure 400 generally comprises header information 402 and blob information 404. In one embodiment, the header information 402 comprises a size field 406 for storing the total size of the data structure 400, a version field 408 for indicating the version of the blobs stored in the data structure 400, a checksum field 410, a number of blobs field 412, and one or more offset to blob fields 414. As shown by the illustrative arrows 416, the offset to blob fields 414 include a number used to calculate the starting byte or word boundary of each blob stored in the data structure 400. In some embodiments, in which a uniform size exists for each blob and each blob is stored contiguously in the data structure 400, only an offset to the first blob in the data structure 400 is provided. Alternatively, in some embodiments the first blob always starts at a given location within the data structure 400 and no offset fields 414 are required. The blob information 404 stores each individual metadata blob, including the information described above. A skilled artisan will appreciate that many suitable data structures exist for storing the metadata blob 112 and that the illustrated data structure 400 is only one example of a suitable data structure that does not limit the invention.

Metadata Handler

As indicated above, in a preferred embodiment the metadata handler 102 assists with preserving native metadata by generating and reading a metadata blob 112 that encapsulates the metadata 108. In one embodiment, the metadata handler 102 comprises library functions including a GetBlob module 118 and a SetBlob module 120. Preferably, the GetBlob module 118 is configured to retrieve file data 106 and metadata 108 corresponding to a specified file from data storage 104, to extract the file 110 from the file data 106, to generate a metadata blob 112 corresponding to the extracted file 110, and to transmit the file 110 and the metadata blob 112 to a calling client application 116. Preferably, the SetBlob module 120 is configured to receive a file 110 and a metadata blob 112 from a calling client application 116, to extract metadata from the metadata blob 112 and store the metadata in the data storage 104, and to store the file 110 in the file data 106 of the data storage 104.

In one embodiment, the metadata handler 102 interacts with the data storage 104 using the APIs 114. The APIs 114 comprise file system APIs for the host file systems in which the data storage 104 resides and provide an interface for communicating with the host file system of the data storage 104, retrieving files and associated metadata from the data storage 104, and storing files and associated metadata in the data storage 104. In one embodiment, the metadata handler 102 performs these and other known file system operations by calling standard file system API functions. The APIs 114 provided can include, without limitation, NAS APIs, Windows APIs, Unix APIs, Macintosh APIs, Linux APIs, and the like.

It is expected that the metadata handler 102 will be updated from time to time in order to read or generate metadata blobs that store additional metadata. This may occur, for example, when new file systems or file system variants are introduced which use additional metadata fields. After such an update has occurred, the metadata handler 102 may generate blobs of a different format. Accordingly, after updates have occurred, multiple blob versions may exist. To allow the metadata handler 102 to continue to read all blob versions, the metadata handler 102 is preferably configured such that the SetBlob module 120 can detect and read multiple blob versions. Additionally, the GetBlob module 118 can be configured such that it can selectively generate different blob versions. Such embodiments of the GetBlob module 118 are advantageously able to communicate with previous versions of the metadata handler 102 that may not recognize newer blob versions. In one embodiment, however, the GetBlob module 118 generates a single blob version. One advantage of this embodiment is that it allows for simpler logic of the GetBlob module 118.

Figure 2:
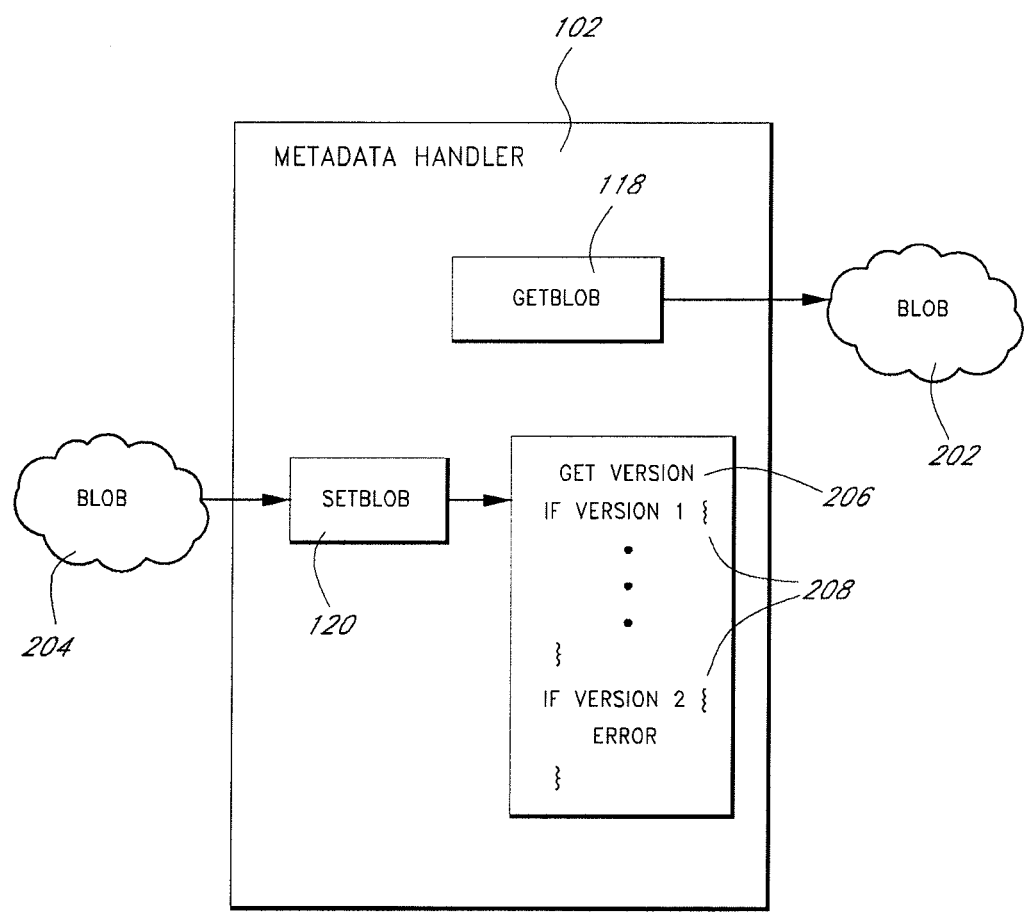
FIG. 2 is a block diagram that illustrates one embodiment in which a SetBlob module is able to handle different versions of the blob.

FIG. 2 is a block diagram that illustrates one embodiment in which the SetBlob module 120 is able to read multiple blob versions. As illustrated, the GetBlob module 118 generates an output blob 202. In this illustrated embodiment, the GetBlob module 118 produces a single blob version. As previously indicated, alternative embodiments of the GetBlob module 118 can selectively output one of several blob versions. As illustrated, the SetBlob module 120 is able to read multiple blob versions. Specifically, the SetBlob module 120 receives a blob 204. The SetBlob module 120 invokes a "Get Version" function 206 to determine which version the blob 204 is. In one embodiment, the Get Version function 206 extracts version information from a version field stored in the blob 204. As illustrated, upon determining the version of the blob 204, the SetBlob module 120 executes operations 208 to choose how to handle each particular blob version. For example, the SetBlob module 120 executes a number of steps for a Version 1 blob. Alternatively, assuming that this is a metadata handler that is capable of reading Version 1 blobs only, the SetBlob module 120 may invoke an error condition if the blob 204 is a Version 2 blob. When an error condition occurs, the SetBlob module 120 may inform the calling client application 116 of such error condition and not store the metadata from the blob 204 in the metadata 108 of the data storage 104.

As described above, embodiments of the GetBlob module 118 and SetBlob module 120 store and retrieve both file data 106 and associated metadata 108. Alternatively or additionally, the metadata handler 102 can be configured to have separate library functions that allow storage and retrieval of metadata 108 only or of file data 106 only. Further, as described above, retrieving and storing file data 106 generally involves little or no modification of the file data 106 because file data 106 is more often than metadata 108 stored in standard formats that can be read by many operating systems or applications with little or no modification. Accordingly, in one embodiment, the metadata handler 102 simply retrieves the file data 106 and transmits it without modifying its format, or conversely receives the file data 106 and stores it without modifying its format. However, a skilled artisan will appreciate in light of this disclosure that the metadata handler 102 can be configured using principles described for the generation and reading of metadata blobs, to also generate and read data blobs, if desired or necessary to reduce or eliminate loss of data for native data stored on non-native file systems.

Client Applications

In one embodiment, the client applications 116 communicate with the metadata handler 102, send and receive files 110 and blobs 112 to and from the metadata handler 102 by invoking the GetBlob module 118 and SetBlob module 120, and perform additional operations on the file 110 and metadata blob 112. In one preferred embodiment, the client applications 116 each comprise one or more wrapper libraries 122. The wrapper libraries 122 provide at least two public interfaces 128 and 130, to the GetBlob module 118 and SetBlob module 120, respectively. Preferably, the public interfaces 128 and 130 include references to the library functions of the metadata handler 102 rather than copies of those library functions. Advantageously, this simplifies system maintenance by ensuring that, if the library functions of the metadata handler 102 are updated properly, that the wrapper libraries 122 will invoke the most current GetBlob module 118 or SetBlob module 120, without requiring constant modifications to the public interfaces 128 and 130. Nevertheless, in alternative embodiments, the public interfaces 128 and 130 can include copies of the library functions.

Advantageously, the GetBlob module 118, SetBlob module 120, and the public interfaces 128 and 130 allow the metadata handler 102 to hide many implementation details from client applications that call the library functions of the metadata handler 102. For example, to store a file and its associated metadata on a host storage device, the client applications 116 need not know the host storage device's file system. Rather, the client applications 116 merely invoke the SetBlob module 120 using its public interface 130 and provide the file 110 and metadata blob 112 for storage, and the metadata handler 102 invokes the appropriate APIs 114 in order to store the file 110 and metadata blob 112 in the data storage 104 of the host storage device. The GetBlob module 118 and the SetBlob module 120 are configured to work in a consistent fashion for any of the client applications 116 regardless of whether the host storage device is a NAS device or operates on a Unix file system, a Windows file system, a Linux file system, a Macintosh file system, or any other file system.

Furthermore, the GetBlob module 118, SetBlob module 120, and the public interfaces 128 and 130 allow the metadata handler 102 to provide a consistent mechanism for storing any file that is native to any supported file system, and the file's associated metadata, while preserving the metadata such that it can later be read natively. The client applications 116 need not know the implementation details of the GetBlob module 118 and the SetBlob module 120 in order to use this functionality.

Advantageously, the GetBlob module 118 and the SetBlob module 120, and the public interfaces 128 and 130, allow the client applications 116 to perform many file operations on the file 110 and the metadata blob 112 without knowing what native format the file 110 and the metadata blob 112 are in. Such operations include, for example, backup, restore, data migration, and the like. Thus, for example, the client applications 116 can perform backup operations to backup storage such as backup disk storage 132 and backup tape storage 134.

In one preferred embodiment, at least one of the client applications 116 resides within the same host storage device as the data storage 104. Preferably, however, while the client applications 116 may reside within the same host storage device, the backup storage 132 and 134 are external to the host storage device. In one embodiment, the backup storage 132 and 134 are connected to a separate computer or other device which is connected via computer network to the client applications 116.

One Process of Retrieving or Storing Metadata Using the Metadata Handler

Figure 3:
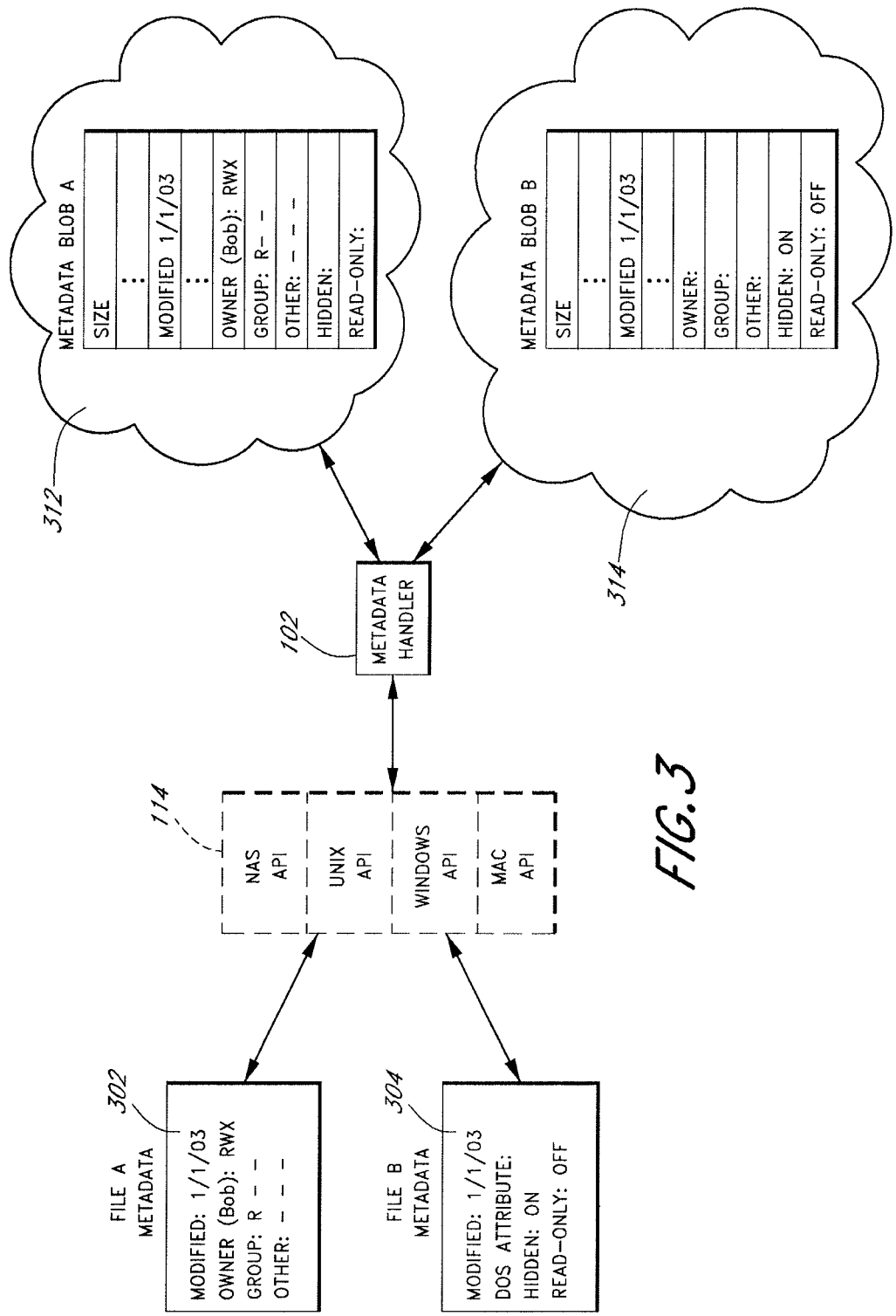
FIG. 3 is a block diagram that illustrates one process of retrieving metadata and one process of storing metadata using the metadata handler according to one embodiment.

FIG. 3 is a block diagram that illustrates one process of retrieving metadata and one process of storing metadata using the metadata handler according to one embodiment. As described above, in one embodiment the metadata handler 102 retrieves and stores file data in addition to metadata. While FIG. 3 focuses, for illustrative purposes, on the processes of retrieving and storing metadata and does not illustrate the retrieval or storage of files, it will be understood that the illustrated embodiment of the metadata handler 102 can also be configured to retrieve and store file data. Alternatively or additionally, the illustrated embodiment of the metadata handler 102 can also be configured to provide library functions that retrieve and store metadata but not file data.

FIG. 3 illustrates the process of retrieving metadata 302 and 304 from the data storage 104 and generating and transmitting metadata blobs 312 and 314. This process can be invoked by a client application by invoking the GetBlob module 118 and providing as an input parameter one or more file identifications. The illustration shows what occurs if a client application requests metadata associated with "File A" and "File B." Upon the invocation of the GetBlob module 118 by the client application, the metadata handler 102 interacts with the APIs 114 in order to request the File A Metadata 302 and the File B Metadata 304 from the data storage 104. The APIs 114 in turn retrieve the File A Metadata 302 and the File B Metadata 304 from the data storage 104 and provide the metadata handler 102 with access to the File A Metadata 302 and the File B Metadata 304.

As illustrated, the File A Metadata 302 and the File B Metadata 304 can, but do not necessarily, have different metadata fields. This typically occurs, for example, when the File A Metadata 302 is associated with a file of one file system and the File B Metadata 304 is associated with a file of another file system. For example, as illustrated, the File A Metadata 302 corresponds to Unix metadata, including owner, group, and other file permissions. The illustrated File B Metadata 304 corresponds to Windows metadata, including DOS attributes such as "Hidden" and "Read-only." A skilled artisan will appreciate that the illustrated metadata fields are simplified and illustrative and do not include all metadata fields. Additionally, while the File A Metadata 302 and the File B Metadata 304 are illustrated as having only the particular metadata fields corresponding to each file system, in one embodiment the metadata 108 stores many possible fields from different supported operating systems and populates the relevant fields. Accordingly, in this embodiment, the File A Metadata 302 may have a field for storing the "Hidden" attribute and the "Read-only" attribute, but these fields are not populated because they do not correspond to a Unix file. Similarly, the File B Metadata 304 may have unpopulated owner, group, and other access permissions fields.

In one embodiment, the metadata handler 102, upon accessing the File A Metadata 302 and the File B Metadata 304, extracts the stored metadata, generates a Metadata Blob A 312 corresponding to the File A Metadata 302 and a Metadata Blob B 314 corresponding to the File B Metadata 304. In one embodiment, as part of generating the Metadata Blob A 312 and the Metadata Blob B 314, the metadata handler 102 determines which fields of each blob to populate, extracts appropriate metadata values for populating such fields from the File A Metadata 302 and the File B Metadata 304, and stores the values in the appropriate metadata fields. As illustrated, in one embodiment the Metadata Blob A 312 and the Metadata Blob B 314 have additional metadata fields beyond those necessary for storing the particular metadata that applies to each file. Preferably, the Metadata Blob A 312 and the Metadata Blob B 314 have sufficient fields to be able to store any possible metadata for any of the file systems supported by the metadata handler 102. This is not a requirement, however. Alternatives exist, as described above in the "Metadata Blob" section.

FIG. 3 also illustrates the process of storing metadata 302 and 304 into the data storage 104 that has been transmitted to the metadata handler 102 as part of the metadata blobs 312 and 314. This process can be invoked by a client application by invoking the SetBlob module 120 and providing as one or more input parameters one or more files and associated metadata blobs. The illustration shows what occurs if a client application invokes the SetBlob module 120 and provides as input File A, File B, and associated metadata blobs Metadata Blob A 312 and Metadata Blob B 314. Upon the invocation of the SetBlob module 120 by the client application, the metadata handler 102 receives the Metadata Blob A 312 and the Metadata Blob B 314. In one embodiment, the metadata handler 102, extracts the stored metadata from the Metadata Blob A 312 and the Metadata Blob B 314. The metadata handler 102 determines how to populate corresponding metadata files or entries to store in the data storage 104. For example, as illustrated, the metadata handler 102 determines how to populate the File A Metadata 302 and the File B Metadata 304. As illustrated by FIG. 2, as part of determining how to populate the corresponding metadata files, the metadata handler 102 may detect the version of each of the blobs 312 and 314 and run appropriate logic for handling the blobs 312 and 314 depending on this version information.

Upon determining how to populate the File A Metadata 302 and the File B Metadata 304, the metadata handler 102 interacts with the APIs 114 in order to request that the File A Metadata 302 and the File B Metadata 304 be created and stored in the data storage 104. The APIs 114 in turn create and store the File A Metadata 302 and the File B Metadata 304.

As illustrated by FIG. 3, the metadata handler 102 advantageously can both generate and read metadata blobs that store metadata associated with two or more file systems. Accordingly, the metadata handler 102 encapsulates and abstracts the functions of storing and retrieving metadata in a way that preserves metadata and prevents or reduces loss when such metadata is transmitted across or stored on non-native file systems. This allows the client applications 116 to rely on the storage and retrieval functions of the metadata handler 102 and to provide for the preservation of metadata without requiring the client applications 116 to know the structure of native metadata for files of multiple file systems. Indeed, the client applications 116 can access the metadata handler 102 in order to perform storage, retrieval, and data migration operations on files and metadata without even knowing the file system of each file.

Use Cases

Figure 5A:
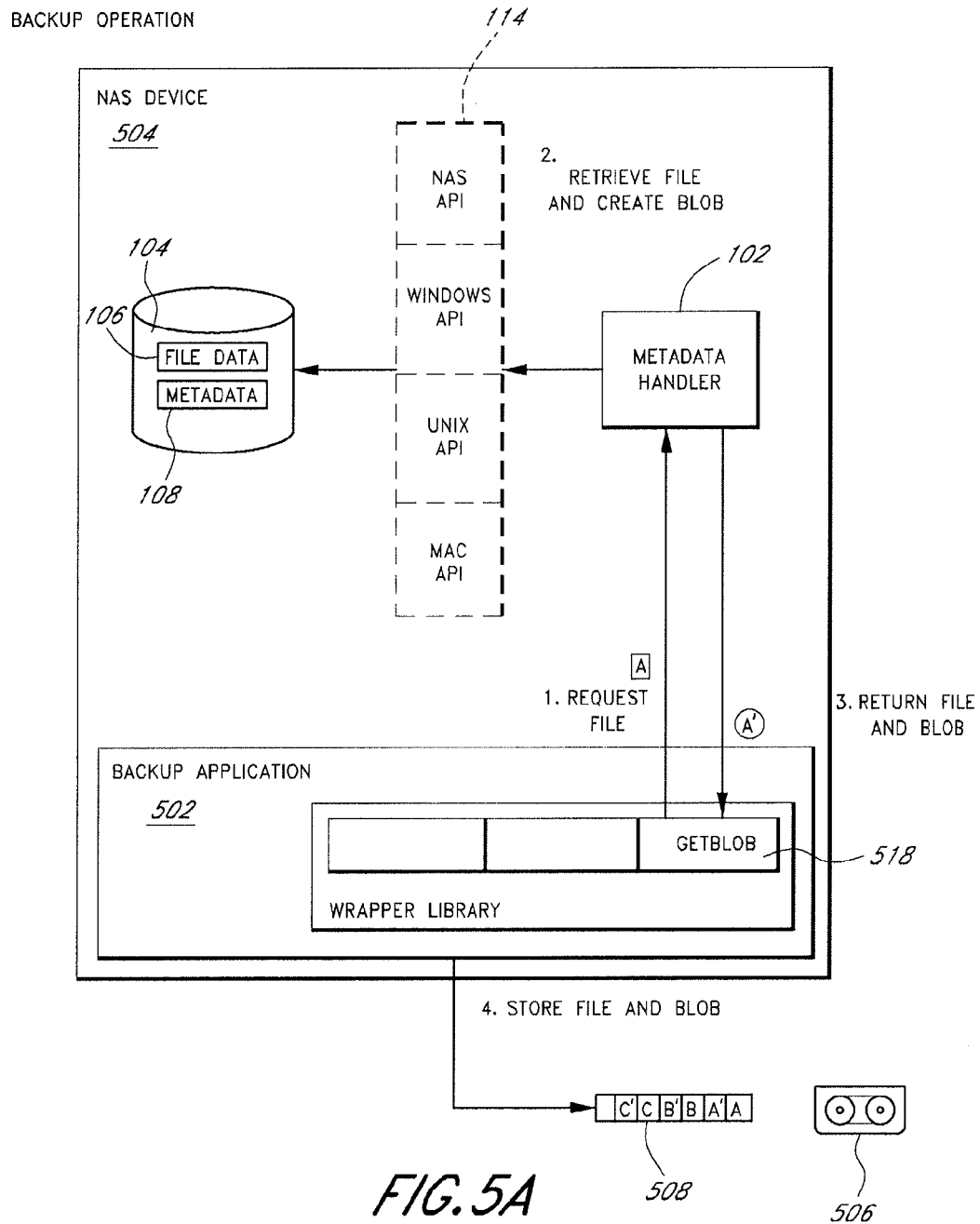
FIG. 5A is a block diagram illustrating how a metadata handler in accordance with one embodiment can be used to support a data backup operation.
Figure 6:
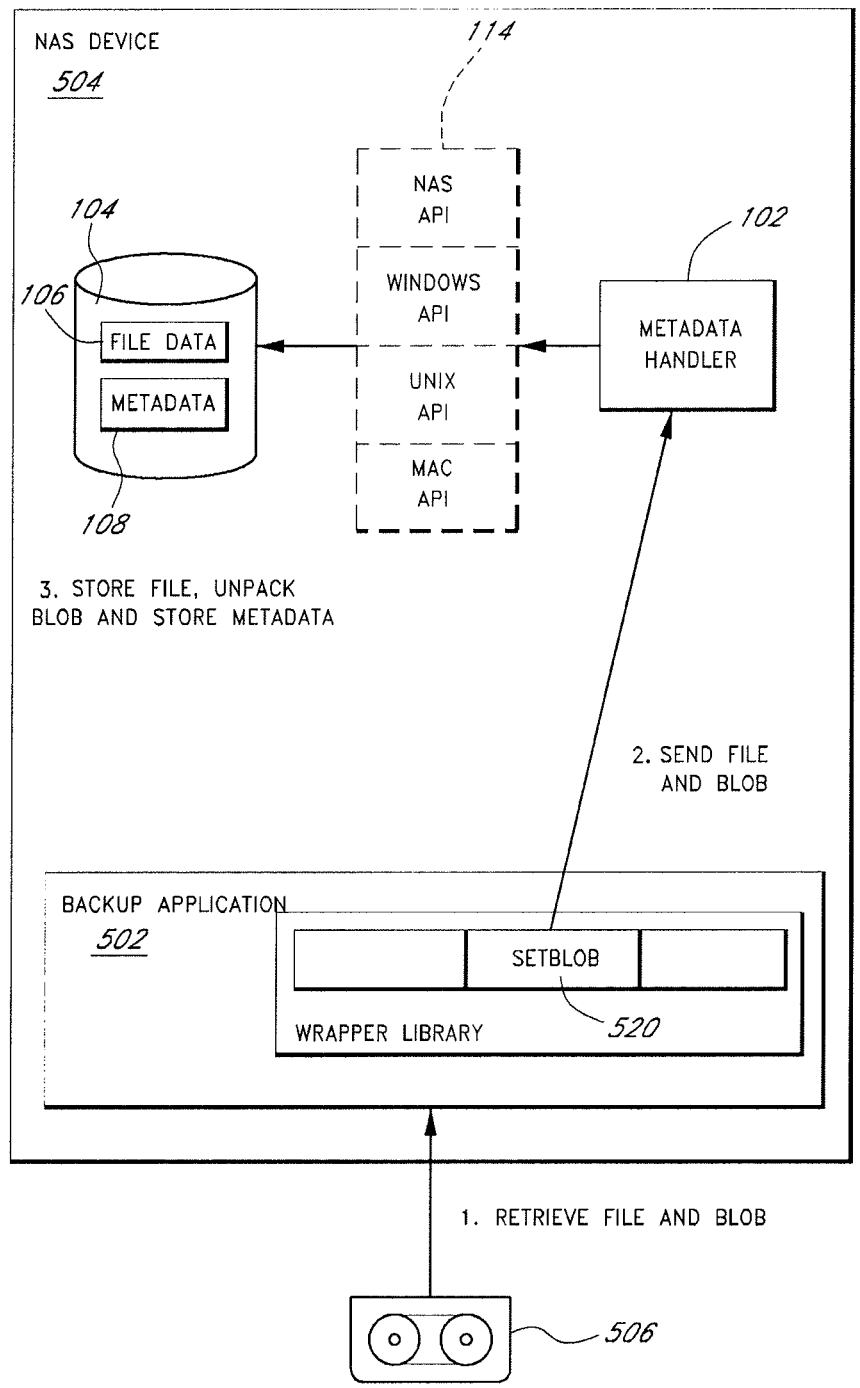
FIG. 6 is a block diagram illustrating how a metadata handler in accordance with one embodiment can be used to support a data restore operation.
Figure 7:
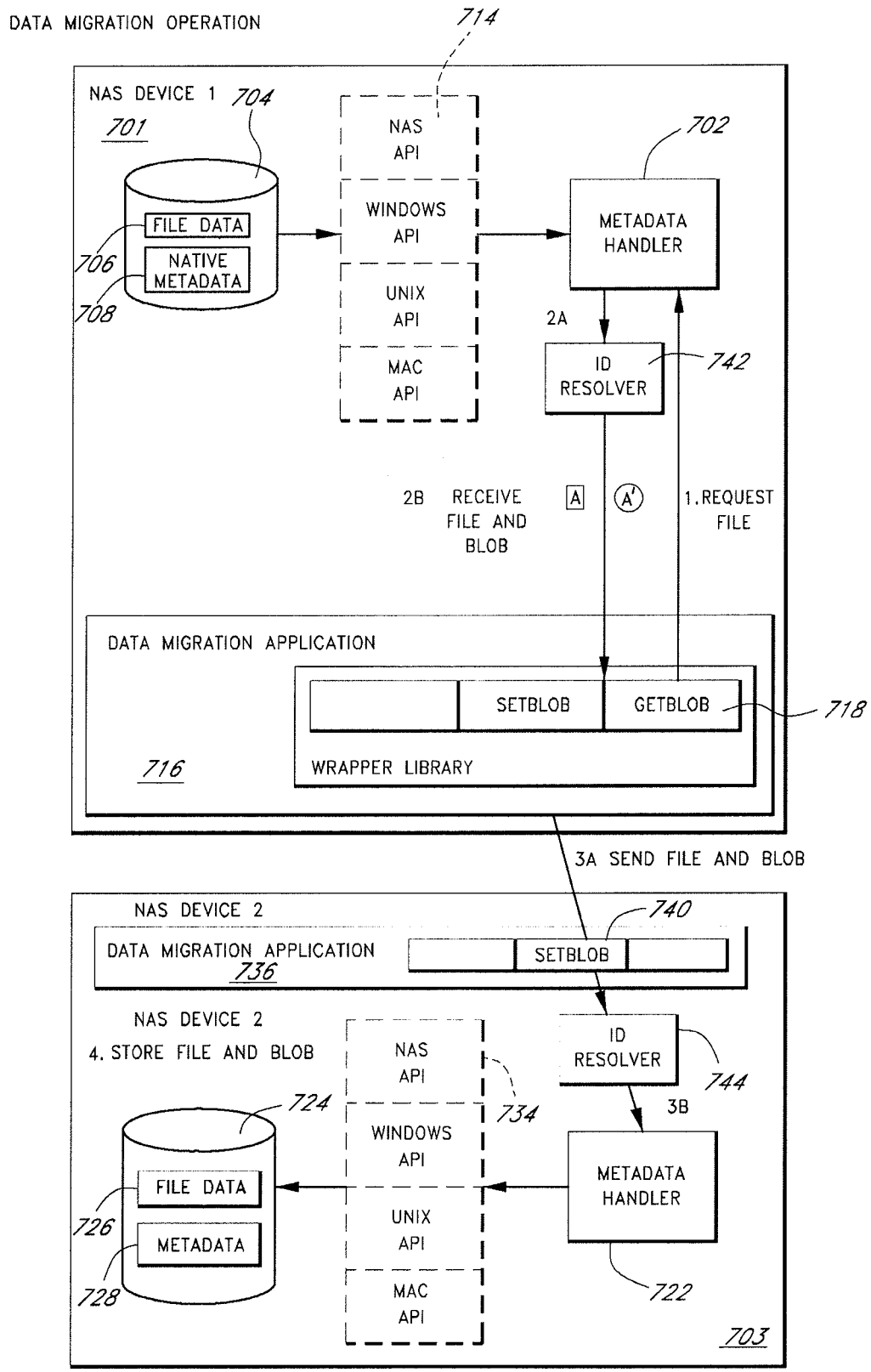
FIG. 7 is a block diagram illustrating how two or more metadata handlers in accordance with one embodiment can be used to support a data migration operation.

FIGS. 5A-7 are block diagrams that illustrate various use cases in which one or more metadata handlers are used to support data replication operations. FIG. 5A illustrates a backup operation. FIG. 5B illustrates a backup operation using a different hardware configuration. FIG. 6 illustrates a restore operation. FIG. 7 illustrates a data migration operation.

Backup Operations

FIG. 5A is a block diagram illustrating how a metadata handler in accordance with one embodiment can be used to support a data backup operation. As illustrated, the backup operation is managed by a backup application 502 running on a NAS device 504. The data storage 104, the metadata handler 102, and the APIs 114 are also located on the NAS device 504. A skilled artisan will appreciate, in light of this disclosure, that alternative configurations exist in which one, some, or all of these components are distributed across multiple devices. As illustrated, the backup application 502 can be configured to store files and metadata on external tape data storage 506. A skilled artisan will appreciate in light of this disclosure that other backup storage devices can be used.

In the illustrated backup operation, the backup application 502 invokes the GetBlob module 118 of the metadata handler 102 using a GetBlob wrapper function 518. The GetBlob wrapper function 518 requests a file, such as, for example File A. The metadata handler 102 receives the file request and in cooperation with the APIs 114 retrieves the File A from the file data 106 and generates a Metadata Blob A' based on information in the metadata 108 that corresponds to File A. The metadata handler 102 returns the File A and the Metadata Blob A' to the backup application 502. The backup application backup application 502 stores the File A and the Metadata Blob A' on the external tape data storage 506. As illustrated by a segment of tape 508, this process can be repeated for multiple files, such as a File B and a File C, such that the external tape data storage 506 can backup multiple files. Advantageously, the files stored on the external tape data storage 506 may be of different file systems. Advantageously, the backup application 502 can store each of these files and their associated metadata, without knowing which file system pertains to each file. Furthermore, the backup application 502, or a different backup application, can use the metadata handler 102 to restore the files and their associated metadata, with reduced loss or no loss of data to the data storage 104, or to different data storage, without knowing the file system of each file.

FIG. 5B is a block diagram illustrating another hardware configuration in which a metadata handler in accordance with one embodiment can be used to support a data backup operation. In this embodiment, a computer network 602 connects a backup server 604 to the backup application 502. In this embodiment, the backup server 604 ultimately controls the backup operation. The external tape data storage 506 or other backup storage device is connected to the backup server 604. The backup server 604 sends a file request to the backup application 502, which forwards the request as described with respect to FIG. 5A. After retrieving the requested file and generating an associated metadata blob, the metadata handler 102 returns the file and the blob to the backup application 502, all as described with respect to FIG. 5A. The backup application 502 forwards the file and the blob to the backup server 604. The backup server 604 stores the file and the blob in the external tape data storage 506. If necessary, the backup server 604 can similarly request the backup application 502 to perform a restore operation and thus similarly control such a restore operation.

Restore Operations

FIG. 6 is a block diagram illustrating how a metadata handler in accordance with one embodiment can be used to support a data restore operation. As illustrated, the restore operation is managed by a backup application 502 running on a NAS device 504. The data storage 104, the metadata handler 102, and the APIs 114 are also located on the NAS device 504. A skilled artisan will appreciate, in light of this disclosure, that alternative configurations exist in which one, some, or all of these components are distributed across multiple devices. As illustrated, the backup application 502 can be configured to retrieve files and metadata to be restored from external tape data storage 506. A skilled artisan will appreciate in light of this disclosure that other backup storage devices can be used.

In the illustrated restore operation, the backup application 502 retrieves a file and an associated metadata blob from the external tape data storage 506. The backup application 502 invokes the SetBlob module 120 of the metadata handler 102 using a SetBlob wrapper function 520. The SetBlob wrapper function 520 provides the retrieved file and associated metadata blob as input to the SetBlob module 120 of the metadata handler 102. The metadata handler 102 receives the file and associated metadata and in cooperation with the APIs 114 stores the file in the file data 106 of the data storage 104, unpacks the associated metadata from the metadata blob, and stores the associated metadata in the metadata 108 of the data storage 104.

Other hardware configurations can also use the metadata handler 102 to perform restore operations. For example, similar to the backup operation of FIG. 5B, a restore operation can be controlled by a backup server that is external to the backup application 502.

Data Migration Operations

A data migration operation is an operation in which data is copied or moved from one host data storage device to another. FIG. 7 is a block diagram illustrating how two or more metadata handlers in accordance with one embodiment can be used to support a data migration operation. The illustrated data migration operation transfers a file from a first NAS device 701 to a second NAS device 703. The first NAS device 701 has or is in communication with a first metadata handler 702, a first data storage 704, one or more first APIs 714, and a first data migration application 716. The first NAS device 701 can optionally also have or be in communication with a first identification resolver 742. The second NAS device 703 has or is in communication with a second metadata handler 722, a second data storage 724, one or more second APIs 734, and a second data migration application 736. The second NAS device 703 can optionally also have or be in communication with a second identification resolver 744. The "Identification Resolvers" section below describes the first identification resolver 742 and the second identification resolver 744.

As illustrated, the data migration operation proceeds as follows. A GetBlob wrapper function 718 of the first data migration application 716 requests a file, such as File A, by invoking a GetBlob module (not shown) of the first metadata handler 702. The GetBlob module cooperates with the first APIs 714 to retrieve the File A and associated metadata from file data 706 and metadata 708 of the first data storage 704. The first metadata handler 702 generates, from the information retrieved from the metadata 708, Metadata Blob A'. The first metadata handler 702 returns the File A and the Metadata Blob A' to the GetBlob wrapper function 718. Optionally as part of transmission of the File A and the Metadata Blob A' to the GetBlob wrapper function 718, the File A and the Metadata Blob A' are processed by the first identification resolver 742, as described in the section "Identification Resolvers."

The first data migration application 716 transmits the File A and the Metadata Blob A' to the second data migration application 736. A SetBlob wrapper function 740 of the second data migration application 736 requests the second metadata handler 722 to store the File A and its associated metadata by invoking a SetBlob module (not shown) of the second metadata handler 722. The SetBlob wrapper function 740 provides the File A and the Metadata Blob A' to the SetBlob module as input. Optionally, as part of transmission to the second metadata handler 722, the File A and the Metadata Blob A' are processed by the second identification resolver 744, as described in the section "Identification Resolvers." The SetBlob module of the second metadata handler 722 cooperates with the second APIs 734 in order to store the File A in file data 726 of the second data storage 724, to extract metadata from the Metadata Blob A', and to store the extracted metadata in metadata 728 of the second data storage 724.

Identification Resolvers

For many file systems, metadata associated with each file includes access permissions and other metadata that depends, at least in part, on identifying a particular user. For example, Unix uses a UID (user identifier) to identify users and to assign file owners and associate permissions with files. Windows similarly uses an SID (security identifier). Under some circumstances, data migration operations, such as the operation described above in the section "Data Migration Operations," can alter permissions that depend on such UIDs and SIDs. This is because UIDs and SIDs are not guaranteed to be unique. Accordingly, an SID that corresponds to Alice Jones in one Windows domain may correspond to Bob Smith in a different Windows domain. Furthermore, Alice Jones may have an SID of 100 in one Windows domain but an SID of 200 in a different Windows domain.

Accordingly, in order to reduce or eliminate modifications or corruption of permissions that occur as a result of a data migration operation, embodiments of the systems described herein have an identification resolver such as the first identification resolver 742 and the second identification resolver 744. In one embodiment, during a data migration operation, the first identification resolver 742 receives a File A and a Metadata Blob A'. Part of the Metadata Blob A' includes a user identifier such as an SID or a UID. The first identification resolver 742 converts the user identifier (100 for example) to a full user name, such as, for example, Alice Jones. The first identification resolver 742 does this, for example, by looking up user information in a central database such as one maintained by a Windows primary domain controller. One function for looking up such information is the getpwdent( ) function. Any function suitable for retrieving a full user name based on a user identifier can be used. The first identification resolver 742 stores the full user name as part of the Metadata Blob A'.

On the other end of the data migration operation, the second identification resolver 744 performs an inverse operation to determine a local user identifier. For example, the second identification resolver 744 may query a central database such as one maintained by a Windows primary domain controller, to determine which user identifier pertains to "Alice Jones." Since the second NAS device 703 may exist in a different Windows domain, Alice Jones may have a different user identifier, and the second identification resolver 744 may determine that this user identifier is "200." The second identification resolver 744 modifies the Metadata Blob A' to reflect Alice Jones' "200" user identifier in this local domain. Advantageously, this reduces or eliminates the chances that the File A will have associated metadata that is incorrect for the local domain in which the second NAS device 703 resides.

Implementation Flexibility

A skilled artisan will appreciate, in light of this disclosure, that the preferred embodiments described herein, and other embodiments that are apparent to a skilled artisan, can be implemented with some degree of flexibility. For example, while the systems described herein are generally described as being implemented in software executed on one or more hardware devices, a skilled artisan will appreciate, in light of this disclosure, how to implement equivalent systems in any combination of hardware, software, and firmware. For example, any "module" described herein could be implemented in any combination of hardware, software, and firmware. For a software implementation, a "module" comprises a logical grouping of one or more computer executable instructions that collectively define a function or other algorithm that is performed by a processor when the processor executes the instructions. For a hardware implementation, a "module" comprises a configuration of logic gates and other circuits configured to performed a function or other algorithm.

Additionally, while separate functions are sometimes described herein as being performed by separate "modules," a skilled artisan will appreciate in light of this disclosure that any two modules can be combined into a single module and that any one module can be divided into two modules without departing from the principles described herein. All such modifications and any other modification that is apparent to a skilled artisan in light of this disclosure, are within the scope of this disclosure.

In light of the foregoing, a skilled artisan will appreciate that the invention is not limited to the preferred embodiments. For example, some of the features and components described herein are preferred but not required and can be omitted from certain embodiments. Accordingly, only the following claims, whether originally presented or added by amendment or in any subsequent application, set forth the limitations of the invention.

We claim:

1. A method of providing a data file and associated metadata, the method comprising:
    receiving a file access request for a file from a non-native storage device;
    accessing the file and the associated source metadata in native data storage of a first file system;
    generating, using the associated source metadata of the file, a metadata object corresponding to the file, the metadata object encapsulating information from which at least a portion of the associated source metadata can be restored in a first file storage format native to the first file system, and wherein the metadata object includes a first portion for storing first metadata corresponding to the file, the first metadata formatted in the first file storage format native to the first file system, and a second portion storing second metadata corresponding to the file, the second metadata formatted in a second file storage format native to a second file system and different from the first file storage format;
    providing the file and the metadata object to the non-native storage device, wherein the non-native storage device has a format different from the first file storage format native to the first file system;
    storing the file and the metadata object in the non-native storage device;
    retrieving from the non-native storage device the file and the metadata object with a native storage device of the first file storage format; and
    restoring the associated source metadata for the file on the native storage device from the metadata object.

2. The method of claim 1, wherein the metadata object is a binary large object.

3. The method of claim 1, wherein generating the metadata object comprises populating at least a portion of the metadata object with information corresponding to metadata fields used by the first file system.

4. The method of claim 3, wherein populating at least a portion of the metadata object comprises determining a file system of the associated source metadata and populating a portion of the metadata object to store the metadata fields of the first file system.

5. The method of claim 1, further comprising storing the metadata object on a third file system different from the file system of the associated source metadata without requiring the third file system to be able to read underlying metadata stored in the metadata object.

6. An apparatus for providing a data file and associated metadata, the apparatus comprising:
    at least one processor configured to:
        access a requested file and associated source metadata in a data storage of a first file system;
        generate, using the associated source metadata of the file, a metadata object corresponding to the file, the metadata object encapsulating information from which at least a portion of the associated source metadata can be restored;
        provide the file and the metadata object to a non-native storage device, wherein the metadata object has a format different from the format of the associated source metadata, and wherein the metadata object includes a first portion for storing first metadata corresponding to the file, the first metadata formatted in a first format native to the first file system, and a second portion storing second metadata corresponding to the file, the second metadata formatted in a second format native to a second file system and different from the first file storage format;
        retrieve from the non-native storage device the file and the metadata object; and
        restore the associated source metadata for the file.

7. The apparatus of claim 6, wherein the metadata object is a binary large object.

8. The apparatus of claim 6, wherein the at least one processor is configured to execute a metadata handler configured to communicate with the data storage and having a library of functions, the library comprising:
    a object creation function configured to, when called by a first calling application, receive, from the data storage, source metadata associated with specified file data, and to create a second metadata object and to populate at least a portion of the second metadata object with information from which the source metadata associated with the specified file data can be restored, the populated portion corresponding to metadata fields used by the source metadata's native file system; and
    a object extraction function configured to, when called by a second calling application, receive at least a third metadata object, extract information from the received third metadata object, and generate destination metadata from the extracted information for storage in the data storage, wherein if the received third metadata object was generated by the object creation function from source metadata, the destination metadata includes at least a portion of the source metadata.

9. The apparatus of claim 8, wherein the metadata handler is further configured to perform at least some of its functions at least partially by invoking one or more file system APIs configured to read and write the file data and any metadata.

10. The apparatus of claim 8, wherein the object creation function is further configured to recognize native metadata of a plurality of file systems and to determine which portion of metadata objects to populate based at least in part on which file system is native to the source metadata.

11. The apparatus of claim 8, wherein the object creation function is further configured to recognize native metadata of a plurality of file systems and to determine a format for the metadata object based at least in part on which file system is native to the source metadata.

12. The apparatus of claim 8, wherein the object extraction function is further configured to determine a version of the received third metadata object and to determine how to process the third metadata object based at least in part on the version of the received third metadata object.

\* \* \* \* \*